Patented Apr. 3, 1928.

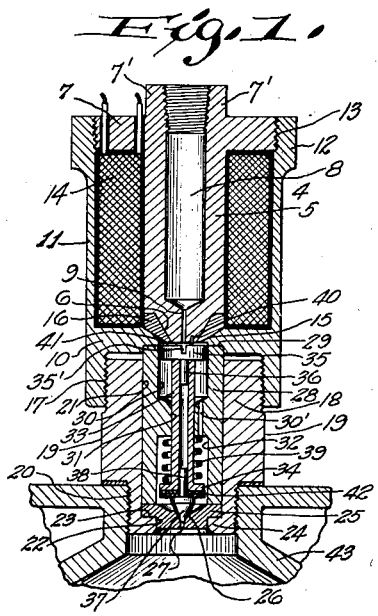

1,664,616

UNITED STATES PATENT OFFICE.

LOUIS O. FRENCH, OF MILWAUKEE, WISCONSIN.

FUEL-CONTROL VALVE.

Application filed May 26, 1926. Serial No. 111,775.

The invention relates to electromagnetically-operated valves, and more particularly to an electromagnetic valve suitable for use in the fuel-feeding or fuel-injection systems of internal combustion engines to control directly or indirectly the amount of fuel supplied to the engine.

The present invention is directed to certain improvements over the fuel control valves of my prior applications, Serial No. 66,769, filed November 4, 1925, and Serial No. 84,102, filed January 27, 1926. The objects are to efficiently seal the valve chamber against possible leakage; to clamp the valve seat member between the valve casing and an outer shell; to provide simple and effective means for adjusting the valve; and to arrange the poles and the sealing means between them in a very compact manner so that the magnetic lines of force are concentrated over a small area whereby the area of the space in which the armature works is reduced to a minimum, thereby reducing the size of the armature and consequently its displacement area so as to permit its efficient action at high engine speeds and at the same time keep the total pressure areas subjected to the fuel pressure very small so that very high fuel pressure may be used without the danger of rupturing the parts or of leakage.

The invention further consists in the several features hereinafter set forth and more particularly defined by claims at the conclusion hereof.

In the drawings Fig. 1 is a vertical sectional view through a control valve embodying the invention;

Fig. 2 is a similar view showing certain modifications;

Fig. 3 is a detail sectional view taken on the line 3—3 of Fig. 2.

In the drawings the numeral 4 designates the electromagnet which in Fig. 1 has a centrally-disposed core 5 with a conical tapered inner pole 6 at one end, a flange 7 adjacent its other end, a central fuel passage 8 and a small fuel passage 9 communicating with said passage 8. An outer pole member 10 surrounds the inner pole and is formed integral with or connected to a return magnetic path portion 11 having a ring portion 12 provided with a threaded bore 13 to receive the threaded edge of the flange 7. A projection having wrench-engaging faces 7' projects above the flange to facilitate assembly of the parts and a suitably insulated energizing coil 14 surrounds the core between the outer pole and the flange 7. The portion 11 is shown in the form of a tube but this tube does not need to be solid but may have slots cut therein, if desired. The inner edge 15 of the outer pole is conically tapered and projects inwardly well beyond the outer surface of the main body of the core so that at the pole face the poles are spaced only a small distance apart. A sealing gasket 16 of brass, bronze, or other suitable non-magnetic material is interposed between the poles and is clamped thereto in a fluid-tight manner by pressure exerted through the core and its threaded connection with the portion 12, thus providing a fluid-tight pole face. To prevent the possibility of magnetic leakage between the poles the taper of the inner pole is steeper than that of the outer pole so as to provide an increasing thickness of the gasket as its distance from the pole face increases.

A threaded tubular portion 17 is associated with the outer pole and receives and is engaged by the upper threaded end of a clamping member 18 which has wrench-engaging sides 19, an exteriorly threaded lower end 20, centrally disposed alined bores 21 and 22 forming a shoulder 23 and flange 24 at the lower end of the member 18.

A valve seat member 25 preferably of non-magnetic material seats at one side against the shoulder 23 and has a seat 26 and a passage 27 which is instanced here as the spray passage of a fuel injection valve though unless otherwise specified the features of construction described herein are not to be limited to use only in injection valves.

A casing member 28 preferably of non-magnetic material is mounted in the bore 21 of the member 18 and seats at its lower end against the upper side of the member 25 and at its upper end against the lower side of the outer pole within an annular centering recess 29 formed therein, and these seating faces are tightly clamped together by the clamping member 18 exerting pressure thereon through the flange 24. Substantially flat seats have been shown as they simplify manufacture, but tapered seats may be used and have been used in a test device.

The casing has alined bores 30, 31 and 32 and a passage 30' between the bores 30 and 32. A control valve working therein includes a hollow stem 33 slidably mounted and guided in the bore 31 and having a flange 34 at its lower end, an armature 35 of soft iron or steel having a slot 35′ and a pin projection 36 tightly fitting within the bore of said stem and a renewable needle valve tip 37 having a pin projection 38 tightly fitting within the bore of said stem.

In addition to the fuel pressure acting on the valve a spring 39 interposed between the upper end of the bore 32 and the flange 34 is preferably provided to normally urge the valve to its seat. The armature works in the chamber formed by the bore 30 and the pole face and may be prevented from contact therewith by an anti-freeze pin 40.

In order to easily determine the working clearance of the valve the outer pole has a recess 41 formed therein whose bottom alines with the inner edge of the gasket and the pole face of the inner pole and whose depth determines this clearance when the top surface of the armature is level with the top edge or levelling surface of the casing member 28, and should wear develop between the valve and its seat a new tip or new seat member may be readily substituted to again bring the armature to the desired position, or provision is made for this wear by interposing one or more very thin shims 42, of metal or paper, between the shouldered part of said tip and the flange 34 so as to bring the top of the armature level with the top edge of the casing and thus maintain the desired working air gap between said armature and the poles which it bridges and to which it is attracted when the coil is energized. As shown, when the valve lifts off its seat fuel under pressure in the space formed by conduits 8, 9, 30, 30′, 32 issues through the nozzle passage 27 into the engine cylinder 43 with which the member 19 is in threaded engagement.

The construction shown in Figs. 2 and 3 is generally similar and similar parts have the same reference numerals. The control valve 44 is shown as made in one piece and a washer 45 forming the spring seat is secured to the stem of the valve by a cotter pin 46. The parts forming the electromagnet have been modified in that the outer pole member 10′ is clamped to a yoke 11′ by the interaction of flanges 47 on said yoke and the core 5′ which has a threaded connection 48 with the transverse portion 49 of said yoke. The member 28 has also been shown as having a recess 28′ to center the valve seat member within it. The outer pole member 10′ has flat surfaces 50 engageable with the flat inner sides of the yoke and a depending threaded sleeve portion 17 with which the upper threaded connection of the member 18 is engaged. When the coil 14 is energized the armature 44′ on the valve 44 is attracted to lift the valve off its seat and fuel in the passage previously mentioned passes through the nozzle 27.

In both constructions it will be noted that the active pole area associated with the armature is small so that the area of the armature may be made small as well as the chamber in which it works, thereby reducing the displacement area of the armature to permit efficient action at high speeds and at the same time keep the total pressure areas subjected to fuel pressure very small so that very high fuel pressure may be used without danger of rupturing parts or of leakage. Furthermore, the arrangement of the casing member 28 effectually seals the chamber containing the valve and the clamping of the valve seat member as described permits the nozzle mounting within the engine cylinder in a compact manner when the device is used as a fuel injector valve. It will also be noted that by unscrewing the member 18 from the part 17 or 17′ that the whole valve assembly may be readily removed therefrom, and that the casing member 28 with the valve and its spring assembled thereto forms a unit which permits ready adjustment or grinding of the valve, or ready removal from the member 18 without changing its adjustment in case the fuel nozzle becomes clogged and it is necessary to remove it.

I desire it to be understood that this invention is not to be limited to any specific form or arrangement of parts except in so far as such limitations are included in the claims or necessitated by the prior art.

What I claim as my invention is:

1. In an electromagnetically-operated valve mechanism, the combination with an electromagnet having a fluid-tight pole face including an inner and an outer pole, a clamping member associated with said outer pole and having a bore, a casing member removably fitting within said bore and clamped by said member against the pole face of said magnet, and a control valve working in said casing member and having an armature cooperating with said poles.

2. In an electromagnetically-operated fuel injector, the combination with an electromagnet having a fluid-tight pole face including an inner and an outer pole, a clamping member associated with said outer pole and having a bore, a casing fitting within said bore and clamped by said member against the pole face of said magnet, a nozzle member interposed and clamped between said casing member and said clamping member, and a valve controlling the passage of fuel through said nozzle and having an armature cooperating with said poles.

3. In an electromagnetically-operated control valve, the combination with an electromagnet having a fluid-tight pole face including an inner and an outer pole, a clamping member associated with said outer pole and having a bore, a casing fitting within said bore and clamped by said member against the pole face of said magnet, a valve seat member, a control valve working in said casing and having an armature cooperating with said poles, a spring interposed between said valve and said casing member, said valve, casing and spring being removable as a unit from said clamping member.

4. In an electromagnetically-operated control valve mechanism, the combination with the electromagnet, of a casing member detachably secured thereto, a valve working within said casing member and having an armature cooperating with said electromagnet, clearance-determining means including a levelling surface on said casing member, and a valve seat member secured to said casing, said valve having an adjustable tip to bring the top face of the armature substantially flush with said levelling surface on said casing member.

5. In an electromagnetically-operated control valve mechanism, the combination with an electromagnet having a core provided with a tapered inner pole with a pole face of relatively small cross-sectional area compared to that of the core, an outer pole surrounding the inner pole and tapered so that its inner edge lies within the projected area of the core and is spaced a short distance from the inner pole, a sealing gasket interposed and clamped between said poles to form a fluid-tight joint therewith, a casing member cooperating with said pole face to form a fluid-containing valve housing, and a control valve mounted in said housing and having an armature cooperating with said poles and overlying for a short distance that portion of the outer pole closest to said inner pole.

6. In an electromagnetically-operated control valve mechanism, the combination with an electromagnet having a core provided with a tapered inner pole with a pole face of relatively small cross-sectional area compared to that of the core, an outer pole surrounding the inner pole and tapered so that its inner edge lies within the projected area of the core and is spaced a short distance from the inner pole, the taper of the inner pole relative its axis being less than that of the outer pole, a sealing gasket interposed and clamped between said poles to form a fluid-tight pole face therewith, a casing member cooperating with said joint to form a fluid-containing valve housing, and a control valve mounted in said housing and having an armature cooperating with said poles and overlying for a short distance that portion of the outer pole closest to said inner pole.

7. In an electromagnetically-operated control valve mechanism, the combination with an electromagnet having a fluid-tight pole face including an inner and an outer pole, said outer pole having a clearance-determining recess and a centering recess, a valve casing member having a levelling surface seating in said centering recess, means in which said member is removably mounted for clamping said member against said outer pole to form a fluid-containing valve housing and a control valve mounted in said housing, and having an armature cooperating with said poles.

8. An electromagnetic valve comprising an electromagnet including a core, an outer pole and sealing gasket between the poles, a yoke having inwardly-extending flanges cooperating with the core to clamp the parts together, a casing secured to the outer pole, and a control valve working in said casing and having an armature cooperating with said poles.

9. In an electromagnetically-operated control valve mechanism, the combination with an ironclad electromagnet having closely spaced inner and outer poles, a sealing member interposed and clamped between said poles, a control valve having an armature cooperating with said poles and overlying for a short distance that portion of the outer pole closest to said inner pole, and a member closely surrounding said armature and clamped against said outer pole.

10. In an electromagnetically-operated control valve mechanism, the combination with an electromagnet having a fluid-tight pole face including an inner and an outer pole, said outer pole having a centering recess, a valve casing member having its upper edge seating in said recess, means in which said member is removably mounted for clamping said member against said outer pole to form a fluid-containing valve-housing, and a control valve mounted in said housing and having an armature cooperating with said poles.

11. In an electromagnetically-operated control valve mechanism, the combination with an electromagnet having a core provided with a tapered inner pole with a pole face of relatively small cross-sectional area compared to that of the core, an outer pole surrounding the inner pole and tapered so that its inner edge lies within the projected area of the core and is spaced a short distance from the inner pole, a casing cooperating with said poles to form a valve-housing, and a control valve mounted in said housing and having an armature cooperating with said poles.

In testimony whereof, I affix my signature.

LOUIS O. FRENCH.

CERTIFICATE OF CORRECTION.

Patent No. 1,664,616. Granted April 3, 1928, to

LOUIS O. FRENCH.

It is hereby certified that error appears in the printed specification of the above numbered patent requiring correction as follows: Page 3, line 53, claim 6, for the words "pole face" read "joint"; and line 54, for "joint" read "pole face"; same page, line 71, claim 7, after the word "housing" insert a comma, and line 72, after "housing" strike out the comma; and that the said Letters Patent should be read with these corrections therein that the same may conform to the record of the case in the Patent Office.

Signed and sealed this 6th day of November, A. D. 1928.

(Seal)

M. J. Moore,
Acting Commissioner of Patents.